Jan. 7, 1958  C. W. NIEMAN ET AL  2,818,683
GLASSWARE LATHE

Filed Nov. 10, 1954  5 Sheets—Sheet 1

Jan. 7, 1958 C. W. NIEMAN ET AL 2,818,683
GLASSWARE LATHE
Filed Nov. 10, 1954 5 Sheets-Sheet 2

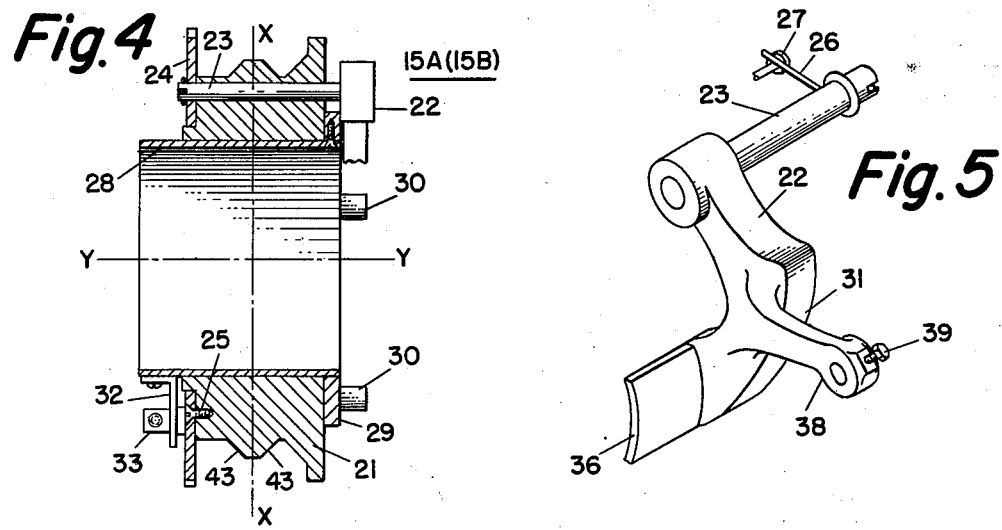
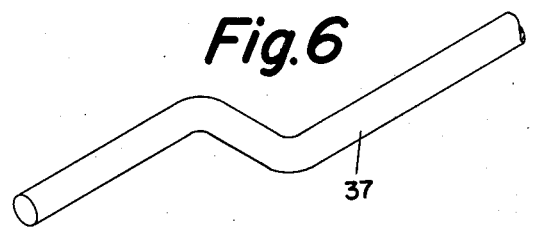
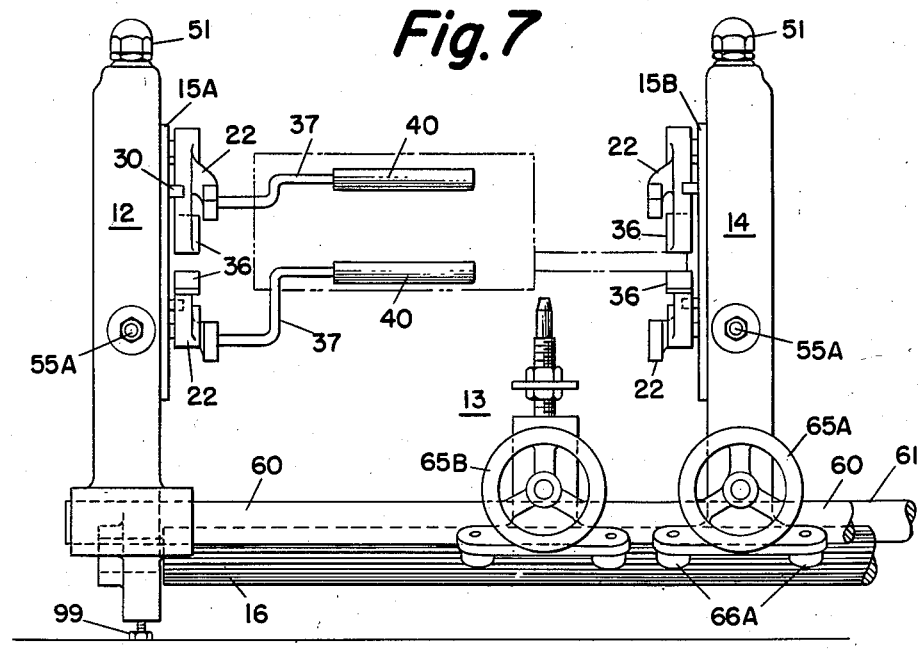

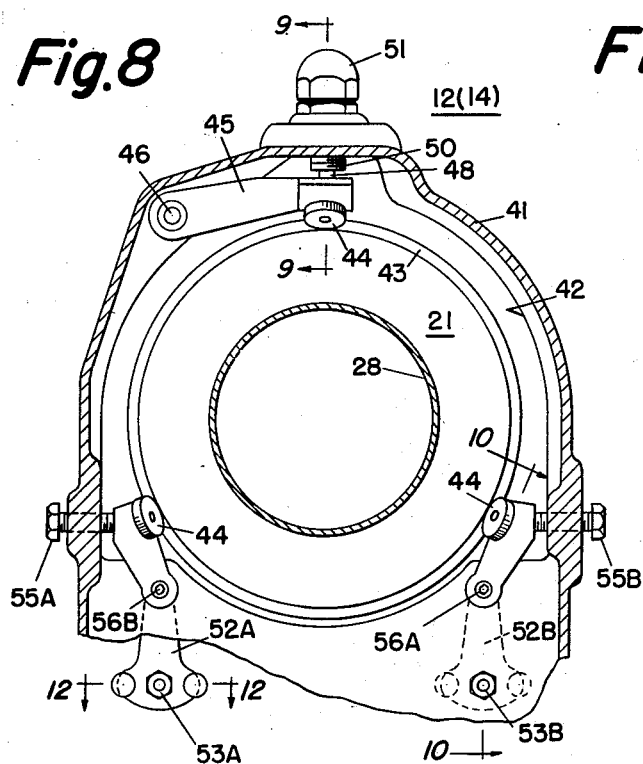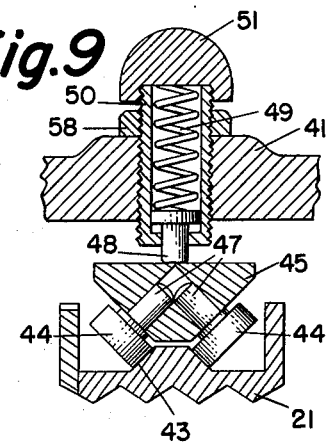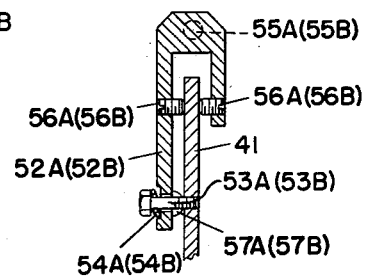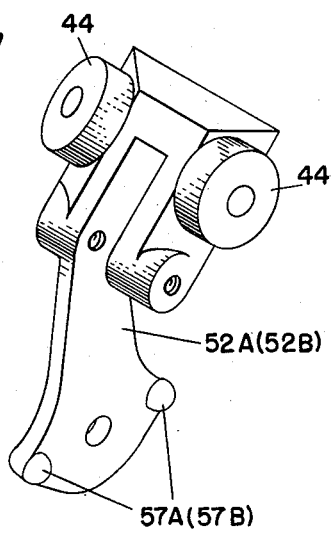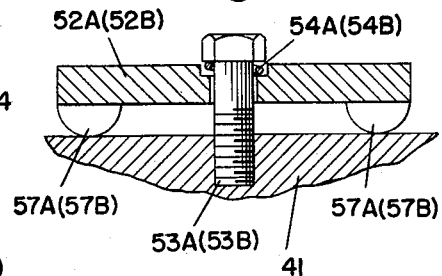

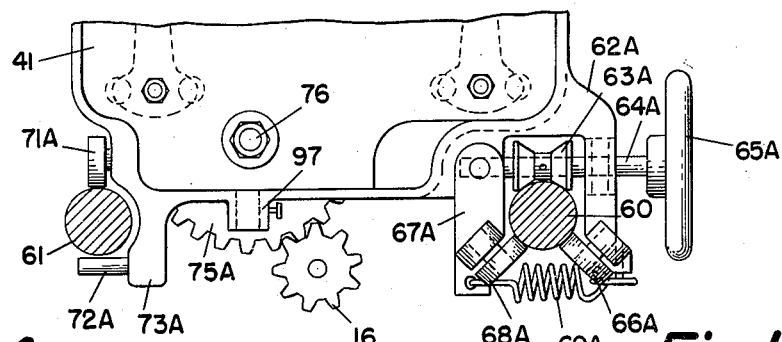
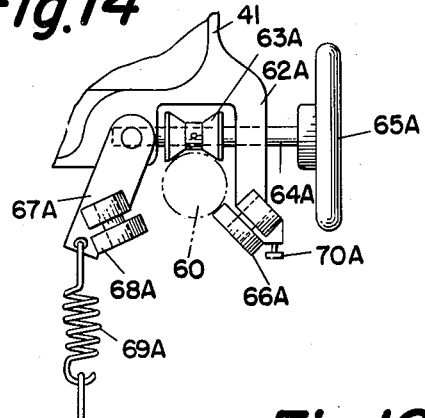
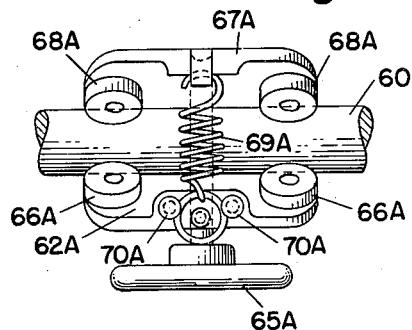
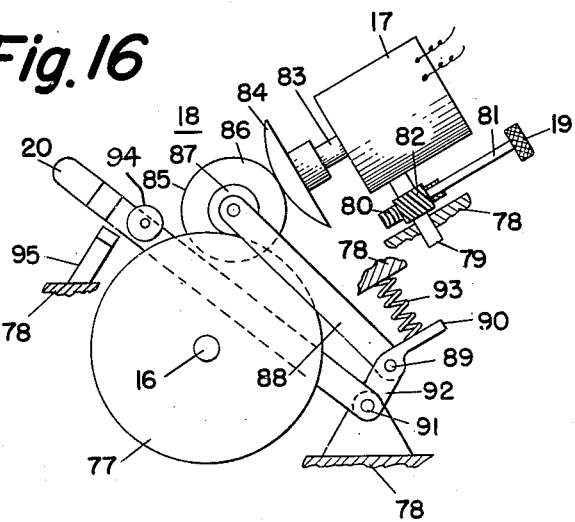

United States Patent Office 2,818,683
Patented Jan. 7, 1958

2,818,683
GLASSWARE LATHE

Chauncy W. Nieman, Bethlehem, and James B. Lawrence, Hellertown, Pa., assignors to Bethlehem Apparatus Company, Inc., Hellertown, Pa., a corporation of Pennsylvania Application November 10, 1954, Serial No. 468,014

10 Claims. (Cl. 49—7)

This invention relates to lathes particularly suited for glassworking operations including the making of ring-seals, T's, flanges, tapers, fusings, closures and the like.

In accordance with one feature of the invention, the headstock and tailstock frames are each provided with a work chuck mounted in a bearing arrangement which permits adjustment of the plane of rotation of the chuck with respect to the plane of the frame and adjustment of the axis of rotation of the chuck vertically and horizontally in the plane of the frame. Preferably, compensation for effects of temperature changes upon the chuck body is obtained by spring-loading one of the bearings. By such bearing arrangements for the chucks, their axes of rotation may initially be brought into coincidence with each other and with a straight line parallel to the lathe bed and may be returned to such position should the relationship of parts be disturbed.

More particularly, each chuck has a peripheral track with bearing surfaces which converge towards a plane normal to the axis of rotation of the chuck and which are engaged by pairs of rollers carried by three arms. The arms are adjustably pivotally mounted on the frame and at least two of them are also adjustable normal to the axis of rotation of the chuck.

In accordance with still another feature of the invention, the tailstock and headstock chucks are driven in synchronism by an elongated pinion running the full length of the lathe bed and engaging chuck-driving gears mounted on the respective frames.

The invention further resides in features of construction and arrangement hereinafter described and claimed.

Figure 1:
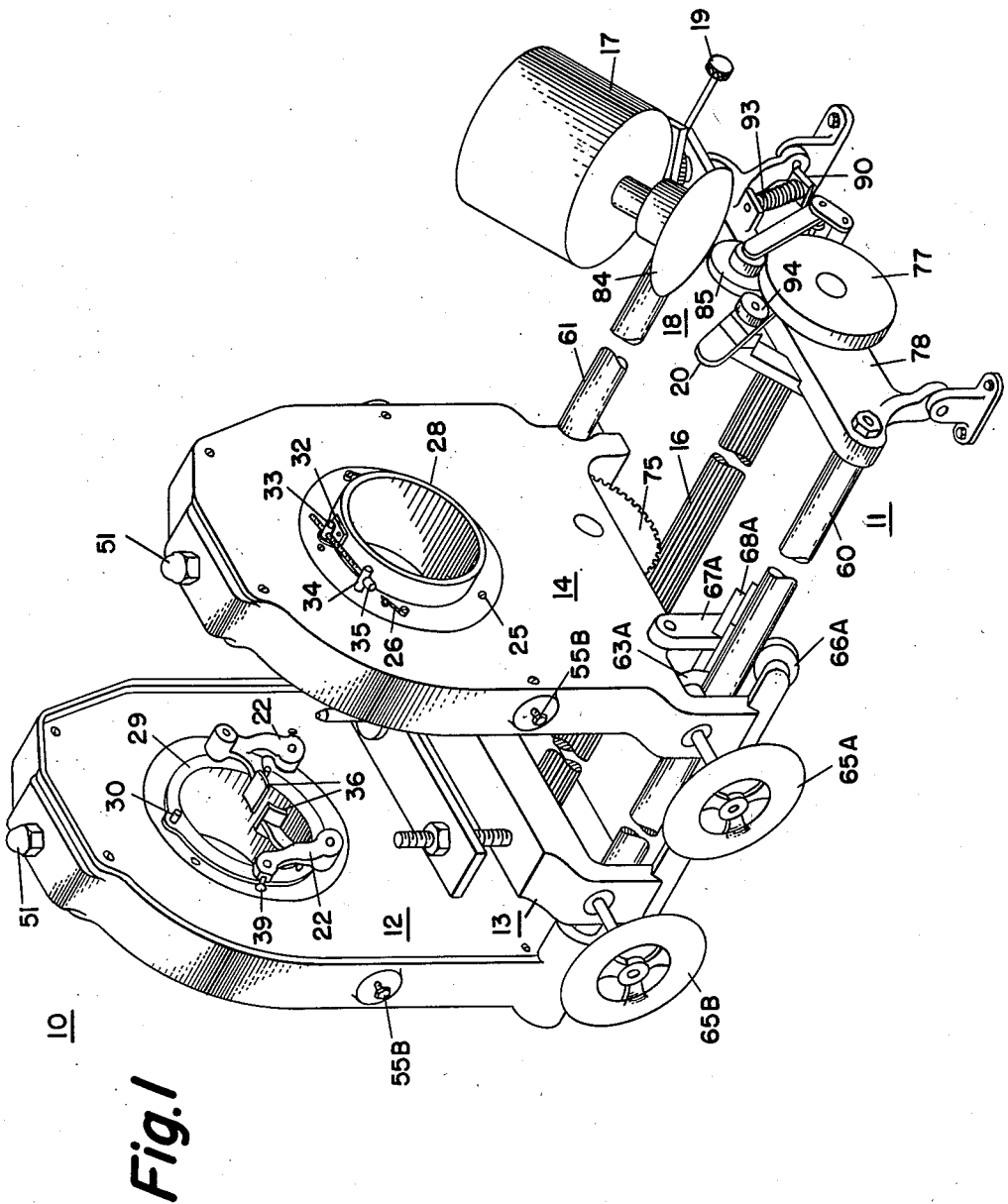
Figure 2:
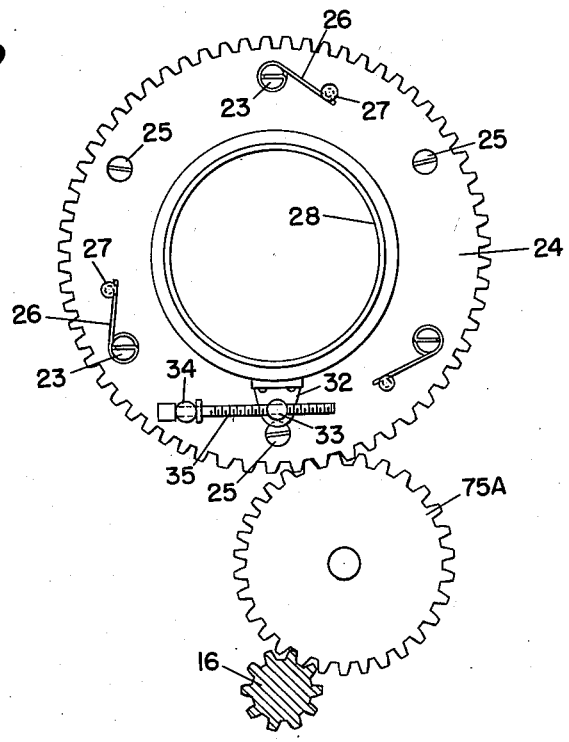
Figure 3:
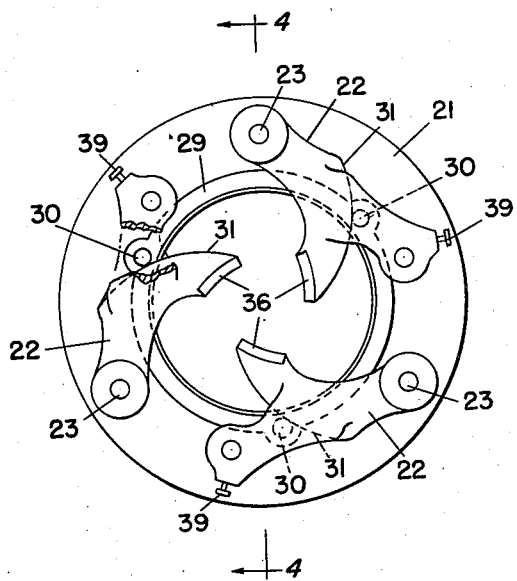

For a more complete understanding of the invention and for illustration of a preferred embodiment thereof, reference is made to the accompanying drawings in which:

Fig. 1 is a perspective view of a glassworking lathe;
Fig. 2 is an end view of one of the chucks of Fig. 1 and its driving arrangement;
Fig. 3 is an opposite end view of the chuck of Fig. 2;
Fig. 4 is a sectional view of the chuck shown in Figs. 2 and 3 and taken on line 4—4 of Fig. 3;
Fig. 5 is a perspective view of one of the chuck jaw arms of Figs. 2 to 4;
Fig. 6 is a perspective view of an auxiliary jaw or extension bar;
Fig. 7 is a partial side view of the lathe shown in Fig. 1;
Fig. 8 is a sectional view showing the chuck of Figs. 2 to 4 and its associated frame and bearing arrangement;
Fig. 9 is a sectional view taken on line 9—9 of Fig. 8;
Fig. 10 is a sectional view taken on line 10—10 of Fig. 8;
Fig. 11 is a perspective view of one of the bearing arms shown in Fig. 8;
Fig. 12 is a sectional view taken on line 12—12 of Fig. 8;
Fig. 13 is an elevational view showing the bearing and anchoring arrangements for the tailstock frame of Fig. 1;
Fig. 14 is a fragmentary view showing, in another position, parts appearing in Fig. 13;
Fig. 15 is a bottom plan view of parts appearing in Figs. 13 and 14; and
Fig. 16 schematically illustrates the chuck drive arrangement shown in Fig. 1.

Referring to Fig. 1, the glassworking lathe 10 comprises a bed 11 to which is fixedly attached the headstock 12. The burner carriage 13 and the tailstock 14 are movable along the bed parallel to the headstock. The work chucks 15A and 15B, respectively rotatably mounted in the headstock and tailstock, are driven by pinion 16 which extends the length of the bed and which is coupled to motor 17 through a variable speed drive 18. The speed at which the chucks are driven in synchronism may be varied by the speed-control knob 19. Starting and stopping of rotation of the work-pieces in the chucks may be effected by the control lever 20 of the drive mechanism 18.

As will later appear, the upper parts of the headstock and tailstock frames are similar and are provided with similar bearing arrangements for rotatably supporting the interchangeable chucks 15A, 15B. Also as will later appear, the lower part of the tailstock frame is similar to the burner carriage and is provided with a similar arrangement for releasably anchoring it to the lathe bed.

Referring to Figs. 3 and 4, the body 21 of each of the chucks 15A, 15B is annular with a bore of diameter large enough to accommodate extension therein of work objects of substantial diameter, for example, four inches. The three arms 22 of the chuck jaws are secured to shafts 23 which extend through the body 21 and also through the gear 24 (Figs. 2 and 4) which is fastened, as by screws 25, to the opposite face of the body 21. As shown in Figs. 2 and 5, the jaw arms 22 are each biased away from the axis of rotation of the chuck by a spring 26 releasably attached at one end to the projecting end of shaft 23 and at its opposite end in engagement with a stop pin 27 projecting from the face of gear 24.

A sleeve 28 which snugly fits the bore of the chuck body 21 (Fig. 4) is provided with a plate 29 from which extend the pins 30, each for engaging the corresponding cam face 31 of one of the chuck arms 22 (Fig. 3). Thus as concentric sleeve 28 is rotated relative to the chuck body 21, the three arms 22 are simultaneously moved toward or from the axis of rotation of the chuck to grip or release the work.

To effect such adjustment of the chuck arms, the opposite projecting end of sleeve 28 is provided with a bracket 32 (Figs. 2, 4) upon which is rotatably mounted a threaded post 33. A similar but unthreaded post 34 attached to the outer face of gear 24 supports a screw 35 threadably received by post 33. Accordingly, as the adjusting screw 35 is rotated by a suitable tool, the jaws at the opposite face of the chuck are moved toward or from each other to engage or release work. As best shown in Fig. 5, the jaws 36 attached to or integral with the chuck arms 22 are of substantial length in direction parallel to the axis of the chuck to provide an extended gripping surface.

This chuck construction affords a wide range of adjustment of jaws 36, and such adjustment may be rapidly and conveniently effected.

To accommodate work of still larger size, or work which is non-circular, or work which must be eccentrically mounted, the chuck arms 22 are constructed to receive auxiliary jaws or extension bars 37 (Figs. 6, 7). Each of these auxiliary jaws is releasably and adjustably held in an extension 38 of the corresponding chuck arm 22 by a locking bolt 39 or equivalent (Fig. 5).

In performing various glassworking operations, the work during its rotation is subjected to high temperatures. Accordingly, it is the practice to pad the chuck jaws with a wrapping 40 of asbestos or other heat-insulating material.

Referring to Fig. 8, the frame 41, exemplary of the upper part of the headstock and tailstock, is provided with an opening 42 suitably larger than the periphery of the associated chuck body 21. As shown in Figs. 4, 8, and 9, the periphery of the chuck body is provided with a peripheral track defined by surfaces 43 which converge toward a plane X—X, Fig. 4, normal to the axis of rotation Y—Y of the chuck. These surfaces are engaged by the three pairs of rolls 44 supported by frame 41 at points spaced peripherally of the chuck body. The upper pair of rolls 44 (Figs. 8 and 9) is mounted on arm 45 pivoted at 46 to frame 41. The shafts 47, 47 (Fig. 9) of this pair of rolls, as well as the shafts for the two other pairs of rolls, are inclined so that the axes of rotation of the rolls are at right angles to each other. Consequently, the thrust around the horizontal and vertical axes is at right angles to the bearing shafts.

To main free rotation of the chuck about a predetermined axis of rotation despite the temperature changes to which the chuck is subjected, the bearing arm 45 is spring-loaded. Specifically as shown in Figs. 8 and 9, the upper face of arm 45 is engaged by a floating pin 48 pressed against the arm by a spring 49 interposed between the pin and a stop provided by the head 51 of the threaded sleeve 50 which receives the spring. The desired loading may be obtained by axially adjusting the hollow sleeve 50 and locking it in the desired position by the lock nut 58.

The other two pairs of bearing rolls 44 are respectively carried by the arms 52A, 52B supported by frame 41 for adjustment about their pivotal axes by the screws 53A, 53B. The pivotal axes of the three arms 45, 52A, 52B are parallel to each other and parallel to the normal axis of rotation of the chuck. The axis of rotation of the chuck may be adjusted horizontally and vertically in the plane of the frame 41 by adjusting the screws 55A, 55B which are threadably received by frame 41 and respectively engage the arms 52A, 52B. For substantial adjustment of these arms, it may also be necessary to readjust the sleeve 50 to obtain the desired spring-loading on bearing arm 45.

For adjustment of the plane of rotation of the chuck with respect to the plane of frame 41, at least two of the bearing arms are also adjustable in a direction normal to the plane of the frame. Specifically, as best shown in Figs. 10 and 12, the upper end of each of arms 52A, 52B straddles a web of the frame 41 and is provided with a pair of threaded stops or screws 56A, 56B which respectively engage the opposite faces of the web. Thus, each of the arms 52A, 52B may be individually adjusted in direction along the axis of rotation of the chuck. Such adjustment of each of the arms 52A, 52B is permitted by a spring washer 54A (54B) interposed between the arm and the corresponding screw 53A (53B) of the arm. Actually such axial adjustment of the arm is a slight rocking motion about an axis normal to the axis of adjustment effected by the screw 55A (55B). To facilitate such rocking movement, each of the arms 52A, 52B is provided with a pair of rounded abutments 57A, 57B (Figs. 10, 11, 12) which serve as pivots for such motion.

As previously stated, the burner carriage 13 and the tailstock 14 are movable along the lathe bed 11 with their planes parallel to the plane of the headstock. The lower part of the tailstock 14 and the burner carriage 13 are of a similar construction and the corresponding parts are identified in the drawings by the same reference characters with different suffixes. Accordingly, for brevity only the construction of the lower part of the tailstock need be specifically described.

Referring to Figs. 13 to 15, the front of the tailstock is provided with an extension 62A which projects below the front bed bar 60 of the lathe. The upper surface of this bar is engaged by a roller or spool bearing 63A attached to shaft 64A which is rotatable about an axis normal to the axis of bed bar 60. Shaft 64A is movable axially so that it is free to select its own axial position. To the outer end of shaft 64A is attached a hand-wheel 65A for moving the frame 41 along the lathe bed: the roller 63A is preferably grooved, as shown, for close correspondence between the movement of the hand-wheel 65A and the resulting movement of frame 41.

Upon the lower part of the frame extension 62A is rotatably mounted a pair of rolls 66A which engage the under surface of the circular bed bar 60. As viewed from the front of the lathe, the axes of these rolls are on opposite sides of the axis of the upper roll 63A and are inclined at right angles to the axes of a second pair of rolls 68A. The second pair of rolls 68A is carried by a gate 67A pivotally mounted on the tailstock frame 41 to the rear of bed bar 60. A spring 69A connected to the gate 67A and detachably connected to the frame extension 62A biases the rolls 68A into engagement with the under face of the bed bar 60. Thus, as shown in Fig. 13, the rollers 63A, 66A and 68A engage the bed bar 60 at points spaced about its periphery; also as may be appreciated from Figs. 13 and 15, on each side of the bar 60 lengthwise thereof, it is engaged by roller 63A and a pair of spaced rolls 66A and 68A. Thus, both in direction along the bed and transverse to the bed, the bearing arrangement between the frame and bed is geometrically rigid so to prevent any swinging movement of the frame as it is moved along the bed. This anchored relation of the frame to the bed may be quickly broken by pulling the front eye of the spring forwardly to release it from pins 70A, whereupon the pivoted gate 67A may be swung to the position shown in Fig. 14 for which it is clear of the bed bar 60.

The tailstock may then be lifted from the bed. The reverse sequence of operations, reclamps the tailstock to the bed. The floating arrangement for spool 63A permits the spring 69 to pull the frame 41 into a self-centering position of rolls 66A, 68A, 63A about the bed bar 60.

The rear bed bar 61 is preferably also of circular cross section, and its upper surface is engaged by a roller 71A rotatably mounted on frame 41. The pin or bar 72A projecting from the extension 73A of the tailstock frame 41 may be slightly spaced from the under surface of the bed bar 61 and its purpose is to prevent this portion of the tailstock from rising away from bed bar 61.

As previously stated, the burner carriage is provided with a similar bearing arrangement for releasably attaching it to the lathe bed and for holding its plane normal to that of the headstock and tailstock during movement of the carriage along the bed. The upper face of the burner carriage is provided with suitable arrangements for mounting of the different sizes, shapes and types of burners used in the various glassworking operations.

As previously stated, the chucks 15A and 15B of the headstock and tailstock are driven in unison. For such purpose and as generically shown in Fig. 2, the gear 24 attached to the body 21 of the corresponding chuck is in mesh with a gear 75 rotatably mounted on the corresponding headstock or tailstock frame. The gear 75A is preferably of fibre and is continuously in mesh with the pinion 16 extending the complete length of the frame to maintain driving engagement with the chuck 15B as the tailstock is moved along the frame. The pinion during its rotation clears itself of glass chips incident to some glassworking operations.

At the end of the bed remote from the tailstock, the shaft of the drive pinion 16 extends through the end frame member 78 of the bed and is there provided with a friction disc 77 (Figs. 1 and 16). This disc, as briefly mentioned above, is driven by motor 17 through a variable speed drive 18. The motor 17 is pivotally supported from the lathe bed by a shaft 79 which extends in direction normal to the axis of rotation of the motor shaft 83. The worm wheel 80 attached to shaft 79 is in engagement with a worm 82 on the shaft 81 of the speed-control and reverse knob 19.

The friction drive plate 84 attached to the motor shaft 83 is of spherical shape, the radius of curvature of the sphere having its center on the axis of adjustment of motor 17 afforded by shaft 79. Between the friction drive member 84 of the motor and the friction disc 77 on the shaft or pinion 16 is interposed an intermediate friction element 85 which may be a single disc or, as shown in Fig. 16, may comprise two discs 86, 87 of different diameter and rotatable as a unit for speed-reduction purposes. This intermediate drive element 85 is mounted on arm 88 pivoted at 89 to an arm 92 on the control lever 20 which is pivoted on shaft 91 supported from the frame 78 of the lathe. A spring 93, interposed between the frame 78 of the machine and extension 90 of the control arm or lever, biases the intermediate element 85 into the bight of the friction surfaces 84 and 87 so that a continuous drive connection is maintained between these members for all positions to which the motor 17 may be adjusted about its speed-control axis 79. It is here to be noted that the arc of adjustment of the motor 17 is such that the work chucks may be driven in either direction and at any desired speed throughout a wide range.

To stop rotation of the work chucks, the control lever is depressed (Fig. 16) to rotate it in counterclockwise direction about its axis 91. This moves the intermediate drive member 85 out of engagement with the spherical motor-driven surface 84: at the same time, a rubber brake roll 94 is moved by lever 20 to engage the disc 77 so to stop any further rotation of the work due to inertia of the chucks. The control lever 20 is releasably held in the "Stop" position by a suitable latch 95 attached to frame 78.

As shown in Fig. 1, the bed or frame member 78 is provided with feet 96 which are pivotally mounted thereto. With the lathe operated in horizontal position, as is the usual case, the feet are in the position shown and the bed is leveled by the adjusting screws 99 (Fig. 7) extending from the lower face of the headstock. For use of the lathe in vertical position, the bed is swung around the pivots of feet 96 until the frame 78 is engaged by stops not shown. With the lathe in such position, the tailstock and burner carriage are connected by pulley and cord arrangements (not shown) to counterweights. Also when the lathe is so used, the tailstock is balanced by a weight and bar arrangement (not shown) received by the hub 97, Fig. 13, of the tailstock.

Because of the various features above described, the lathe has a range and adaptability for glassworking operations far beyond lathes of conventional type. Practically all forms of glasswork and kinds of glassworking operations can be set up and performed upon this lathe.

Features of construction and arrangement herein disclosed but not claimed are claimed in our copending applications Serial Nos. 683,605 and 683,881, filed September 12, 1957 and September 13, 1957 respectively.

What is claimed is:

1. A lathe having a bed and comprising two frames extending in parallel planes at right angles from the lathe bed, two work chucks, a group of three spaced bearing structures supported by each of said frames and engaging the periphery of the corresponding chuck to support it for rotation, a set of positioning members for individually adjusting the bearing structures of each group in said plane of the corresponding frame, and a second set of positioning members for individually adjusting two bearing structures of each of said groups in direction normal to said plane of the corresponding frame, said sets of adjustable members jointly providing attainment of a desired relation between the axes of rotation of work-pieces respectively held by said chucks.

2. A lathe as in claim 1 in which said bearing structures for each chuck comprise arms having pivotal axes substantially parallel to the axis of rotation of the chuck, in which the first set of positioning members angularly adjusts the associated arms about their said pivotal axes, and in which the second set of positioning members adjusts said associated arms in direction parallel to their said pivotal axes.

3. A lathe as in claim 1 in which each of said bearing structures comprises a pair of rollers rotatable about axes at right angles to each other, and in which each chuck has peripheral surfaces which are respectively engaged by the corresponding rollers of each pair of the associated bearing structures and which converge toward a plane normal to the axis of rotation of the chuck.

4. A lathe as in claim 1 in which each of said frames supports gear means in mesh with a gear of the corresponding chuck, and in which an elongated drive pinion meshes with said gear means of both frames to effect concurrent rotation of said chucks each about an axis preset by adjustment of the associated sets of positioning members.

5. A lathe as in claim 1 in which each of said chucks comprises an annular body member, a plurality of jaw members pivotally mounted on one face of said body member and having cam surfaces, springs biasing said jaw members away from the axis of rotation of the chuck, a concentric sleeve extending through the bore of said annular body member, cam structure carried at one end of said sleve for engaging said cam surfaces of the biased jaw members, and adjusting means including members respectively attached to the opposite face of said body member and to the other end of said sleeve to effect work-gripping adjustment of said jaw members.

6. A sub-assembly for a lathe comprising a frame for attachment to the lathe bed, said frame having a large opening extending therethrough in direction lengthwise of the bed, three arms pivotally mounted on said frame about said frame opening and carrying bearing members, a work chuck having peripheral track structure engaged by said bearing members rotatably to support said chuck within said frame opening, positioning members for adjusting said arms about their axes to shift the axis of rotation of the chuck in the plane of said frame, and positioning members for adjusting at least two of said arms in direction normal to said plane.

7. A lathe sub-assembly as in claim 6 in which at least one of said arms is spring-loaded to maintain engagement between said track structure of the chuck and said bearing member.

8. A lathe sub-assembly as in claim 6 in which each of the arms carries two rollers rotatable about axes at right angles to each other and to a plane through the pivotal axis of the arm, and in which the peripheral track structure of the chuck comprises bearing surfaces converging toward a plane normal to the axis of rotation of said chuck.

9. A lathe sub-assembly as in claim 6 in which the work chuck comprises an annular body member, a plurality of jaw members pivotally mounted on one face of said body member and accessible from the corresponding face of the frame for placement of work, and jaw-adjusting means accessible at the other face of said frame including structure mounted on the other face of said body member of the chuck.

10. A sub-assembly as in claim 6 in which the frame is additionally provided with structure for fixedly attaching it to a lathe bed whereby the sub-assembly serves as the headstock of a lathe.

References Cited in the file of this patent

UNITED STATES PATENTS

| | | |
|---|---|---|
| 1,401,131 | Blackburn | Dec. 27, 1821 |
| 1,131,696 | Hess | Mar. 16, 1915 |
| 1,239,873 | Bright | Sept. 11, 1917 |
| 1,365,826 | Hendrickson | Jan. 18, 1921 |
| 1,428,190 | Stoner | Sept. 5, 1922 |
| 1,642,834 | Yoemans | Sept. 20, 1927 |
| 1,799,179 | Reis | Apr. 7, 1931 |
| 1,912,405 | Ronci | June 6, 1933 |
| 2,209,254 | Aliger | July 23, 1940 |
| 2,293,134 | Hallenbeck | Aug. 18, 1942 |
| 2,512,717 | Dicke | June 27, 1950 |
| 2,564,897 | Hahn | Aug. 21, 1951 |
| 2,630,353 | Rutz | Mar. 3, 1953 |